Feb. 5, 1952 W. PECHY 2,584,157
TRANSFER MECHANISM FOR ARTICLES
Filed April 30, 1948 6 Sheets—Sheet 1

INVENTOR.
WILLIAM PECHY
BY
ATTORNEYS

Feb. 5, 1952 — W. PECHY — 2,584,157

TRANSFER MECHANISM FOR ARTICLES

Filed April 30, 1948 — 6 Sheets-Sheet 4

INVENTOR
WILLIAM PECHY
ATTORNEYS

Feb. 5, 1952 — W. PECHY — 2,584,157
TRANSFER MECHANISM FOR ARTICLES
Filed April 30, 1948

INVENTOR.
WILLIAM PECHY
BY
ATTORNEYS

Feb. 5, 1952 W. PECHY 2,584,157
TRANSFER MECHANISM FOR ARTICLES
Filed April 30, 1948 6 Sheets-Sheet 6

INVENTOR.
WILLIAM PECHY
BY
ATTORNEYS

Patented Feb. 5, 1952

2,584,157

UNITED STATES PATENT OFFICE 2,584,157

TRANSFER MECHANISM FOR ARTICLES

William Pechy, Manasquan, N. J., assignor to American Can Company, New York, N. Y., a corporation of New Jersey Application April 30, 1948, Serial No. 24,303

12 Claims. (Cl. 198—19)

The present invention relates to a machine for performing an operation upon articles and has particular reference to a transfer mechanism for removing the articles in succession from a continuously moving procession and for transferring them into a working station and thence returning them to the continuously moving procession while maintaining the articles in a predetermined spaced and timed order.

An object of the invention is the provision in a machine for performing an operation upon articles of a transfer mechanism for transferring the articles into a working station, the articles passing through the machine in a continuously advancing procession in timed order to facilitate high speed production.

Another object is the provision of such a transfer mechanism wherein any number of working stations may be provided removed from a continuously moving supply of articles and arranged to allow at each station sufficient time to fully effect a desired operation upon each article.

Numerous other objects and advantages of the invention will be apparent as it is better understood from the following description, which, taken in connection with the accompanying drawings, discloses a preferred embodiment thereof.

Referring to the drawings.

As a preferred embodiment of the instant invention the drawings illustrate a rotary transfer mechanism A (Fig. 1) for transferring articles such as container bodies B, from a continuously moving conveyor C, into a conventional working station D, where an operation is performed on the bodies, and for thence returning the bodies to the conveyor for continued travel therewith. By way of example, the conveyor C and the working station D are illustrated as parts of a machine for operating on fibre milk container bodies, such as the machine disclosed in United States Patent 2,200,276 issued May 14, 1940, to J. M. Hothersall et al. on Can End Assembling Machine, although the invention is equally well adapted to other machines and other uses.

Figure 1:
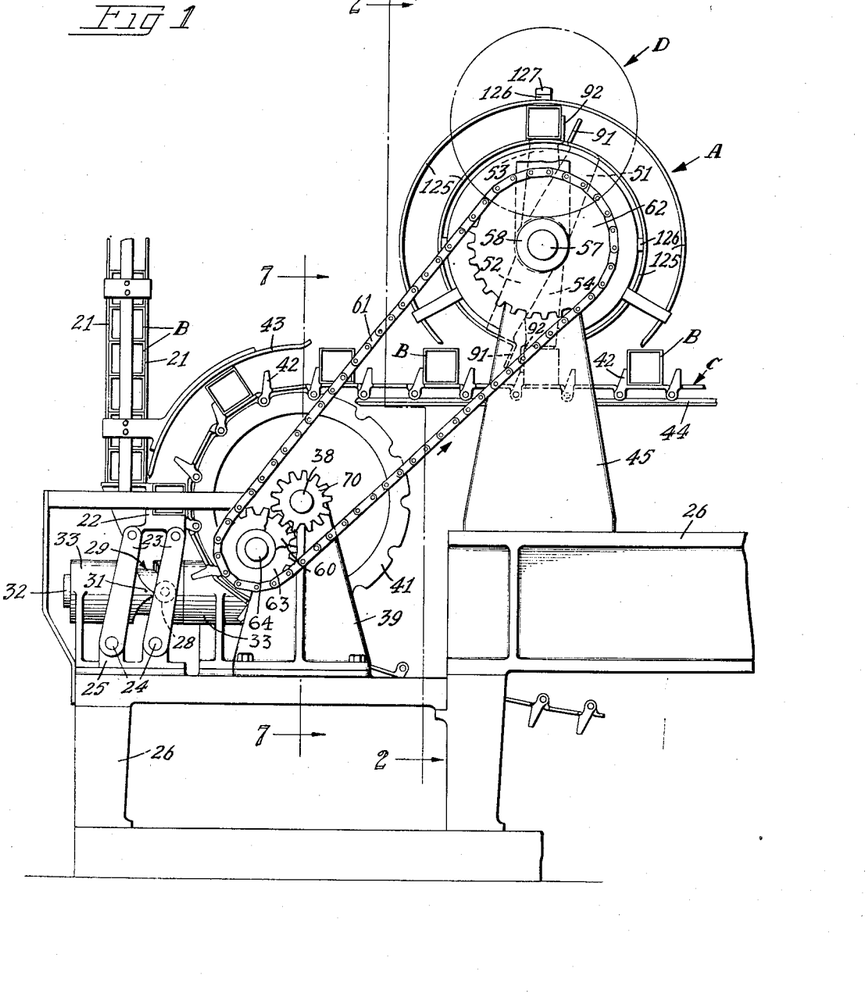
Figure 1 is a side elevation of a portion of a machine including a transfer mechanism embodying the instant invention, with parts broken away.

In the machine the container bodies B to be operated upon are received from any suitable source of supply, such as a stack of such bodies retained in a magazine or chute 21 (Fig. 1). The bodies are fed individually from the bottom of the stack, in timed order, by a reciprocating feed shoe 22 similar to that shown in the above mentioned Hothersall patent and located adjacent the lower end of the chute 21.

The feed shoe 22 is carried on the upper ends of a pair of upright parallel rocker arms 23 mounted on shafts 24 carried in a bearing block 25 bolted to a frame 26 which constitutes the main frame of the machine. One of the rocker arms intermediate its ends carries a cam roller 28 which operates in a cam groove 29 of a continuously rotating barrel cam 31 mounted on a cam shaft 32 journaled in bearing brackets 33 bolted to the frame 26.

Figure 7:
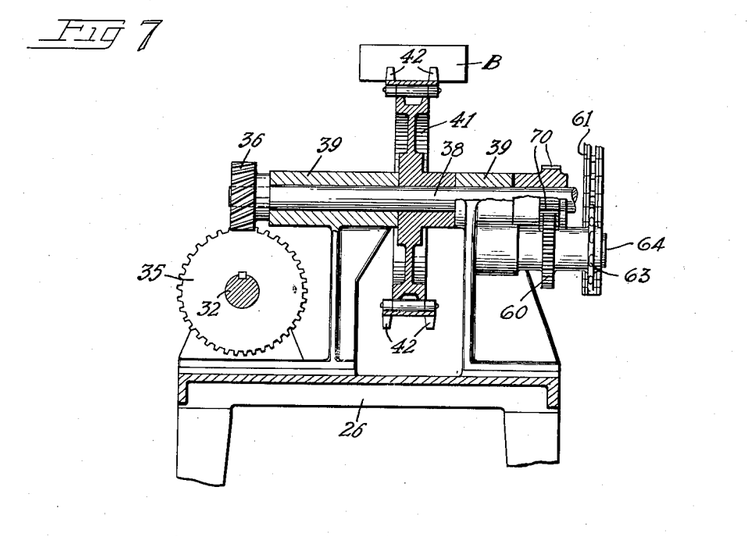
Fig. 7 is a sectional view taken substantially along the line 7—7 in Fig. 1, with parts broken away.

The cam shaft 32 is rotated by a helical gear 35 (Fig. 7) which is carried on the inner end of the shaft. This gear meshes with and is driven by a helical pinion 36 carried on one end of a drive shaft 38 journaled in bearing brackets 39 bolted to the frame 26. The drive shaft 38 constitutes the main drive shaft of the machine and is continuously rotated in any suitable manner.

Hence as the main drive shaft 38 rotates, it revolves the cam shaft 32 and the cam 31 carried thereon and this rocks the arms 23 and thus reciprocates the feed shoe 22 through a forward or feeding stroke and thence through a return stroke. On a feeding stroke the shoe 22 removes a body B from the bottom of the chute 21 and carries it forward while holding back the other bodies in the chute.

A fed body B is received on the conveyor C in a horizontal position extending transversely of the conveyor. The conveyor preferably is of the endless chain type and operates over a sprocket 41 (Figs. 1 and 7) carried on the main drive shaft 38. Thus the conveyor travels continuously. A body fed onto the conveyor is engaged and is propelled in time therewith by a feed dog 42. There are a plurality of these dogs secured to the conveyor at spaced intervals, setting off body-receiving spaces. One body is fed into propelling engagement with each alternate feed dog 42, thus leaving one dog and its adjacent body space free for a purpose which will be hereinafter explained.

A body B received on the conveyor, travels upwardly around the sprocket 41 along a curved retaining rail 43 and thence travels in a horizontal straight line along the upper run of the conveyor. This upper run of the conveyor is supported on a rail 44 which extends the full length of the machine between the operating sprockets. The rail is held in place by brackets 40 which are bolted to the machine frame 26.

Figures 2, 3:
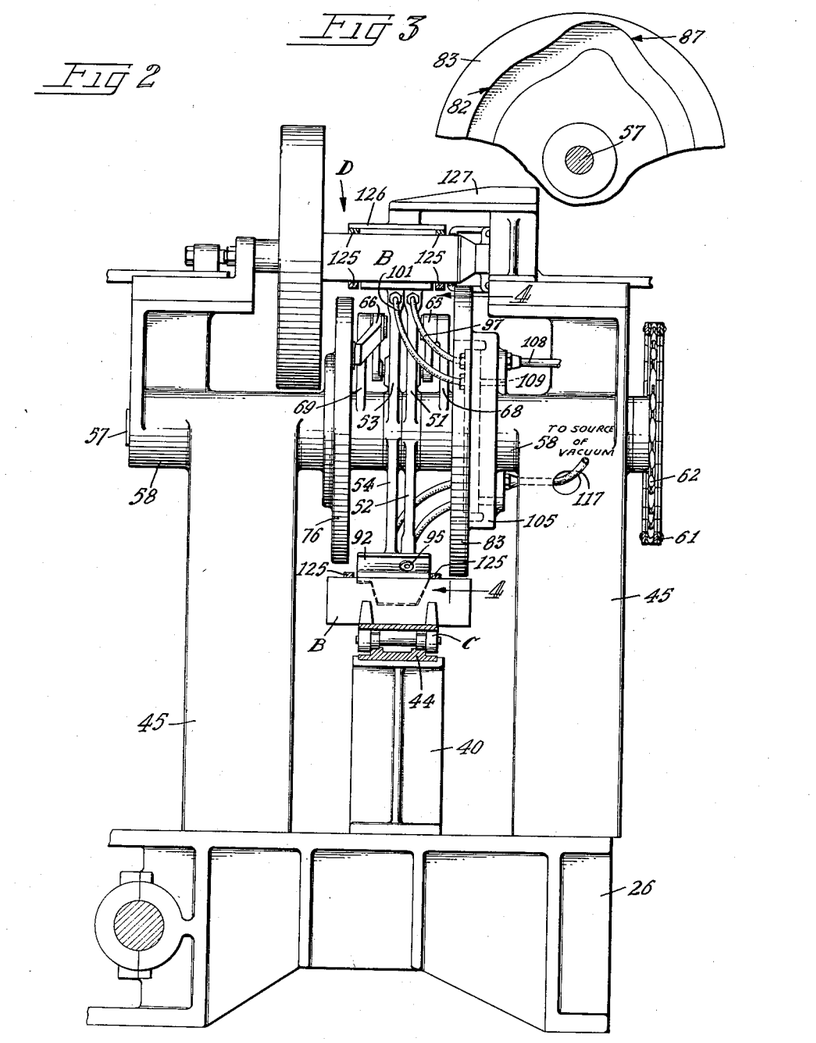
Fig. 2 is an enlarged sectional view taken substantially along the broken line 2—2 in Fig. 1, with parts broken away.
Fig. 3 is an enlarged fragmentary detail of one of the cams used in the machine.

The conventional working station D at which an operation is performed on the bodies B is located above the conveyor C in spaced relation thereto so as to be out of the way of the continuously advancing conveyor. The machine parts which are located at this station which usually are of a reciprocating or intermittently operated nature, are supported on a pair of upright brackets 45 (Figs. 1 and 2) secured to the machine frame 26. These parts may perform any desired operation upon the bodies, the particular operation forming no part of this invention and therefore is not further explained or described in detail.

Figure 4:
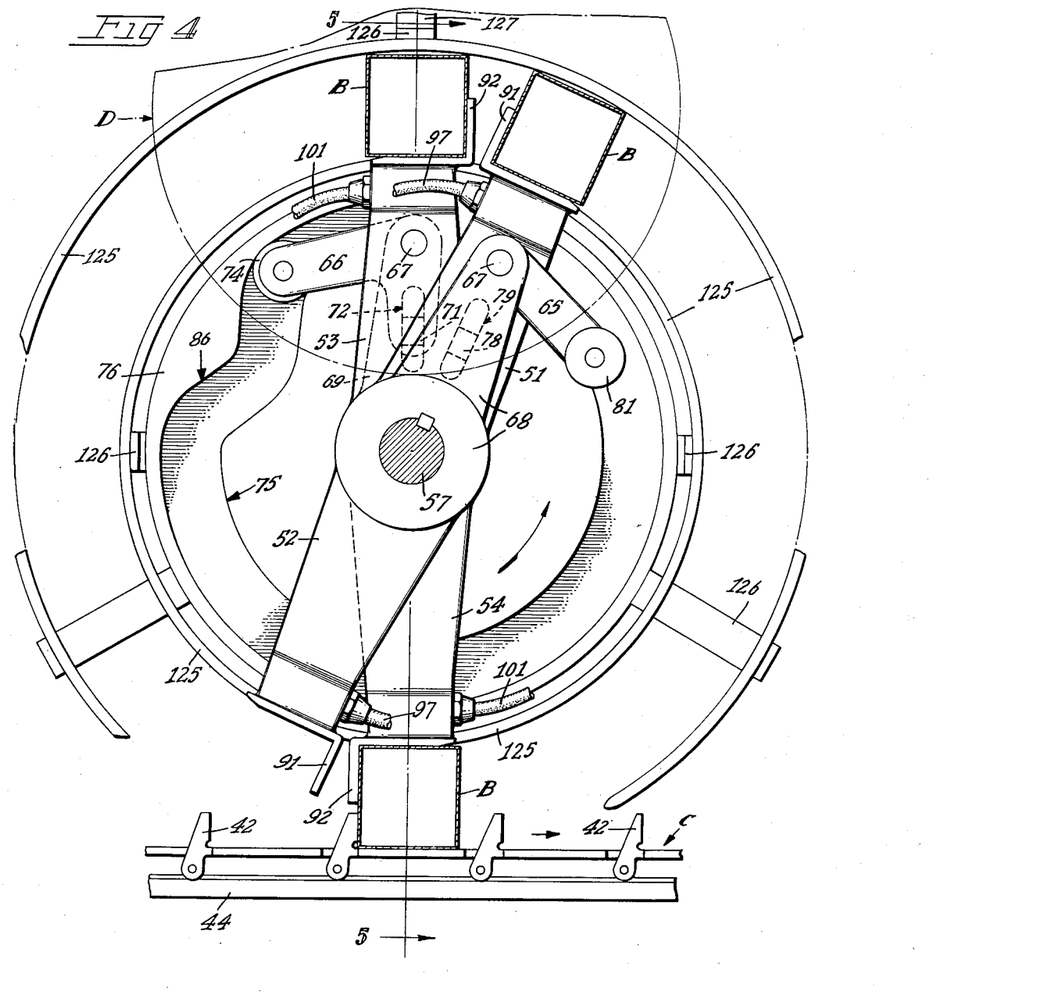
Fig. 4 is an enlarged view taken substantially along the line 4—4 in Fig. 2, with parts broken away.
Figure 5:
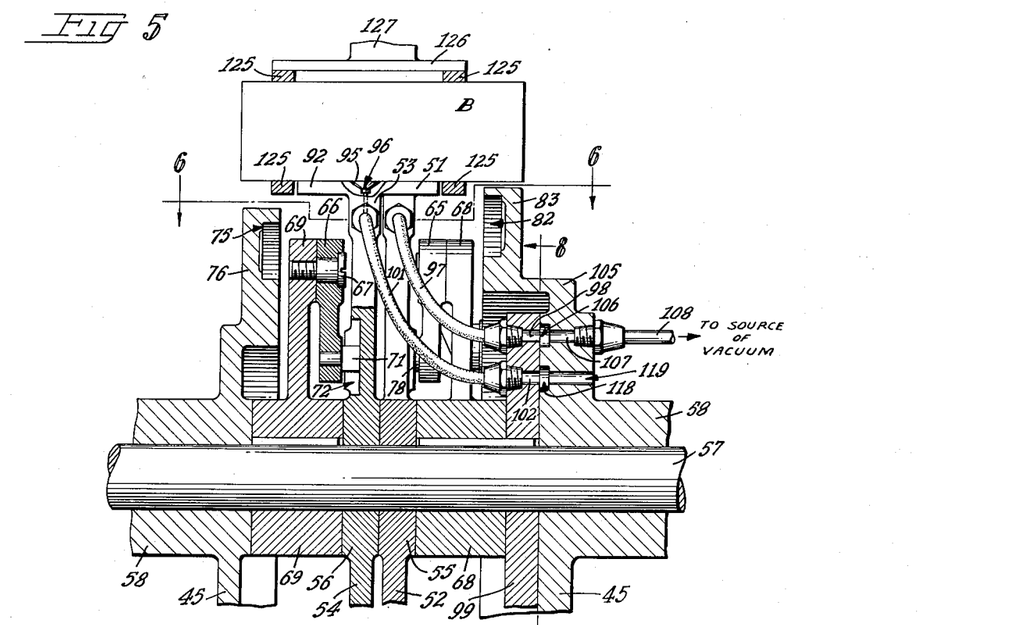
Fig. 5 is a sectional view taken substantially along the line 5—5 in Fig. 4, with parts broken away.
Figure 6:
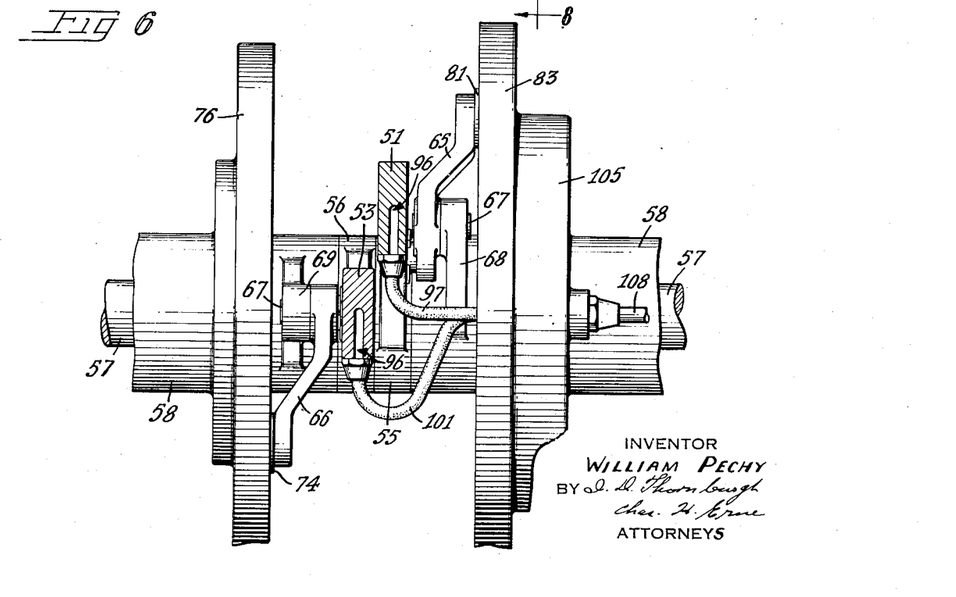
Fig. 6 is a plan view taken substantially along the line 6—6 in Fig. 5, with parts broken away.

The transfer mechanism A which transfers the bodies B from the moving conveyor C to the working station D is located between the conveyor and the station and is of a rotary nature. This transfer mechanism includes two pairs of diametrically disposed radial transfer or pickup arms 51, 52, and auxiliary transfer or delivery arms 53, 54 (Figs. 1, 2, 4, 5 and 6), the arms 51, 52 being formed on opposite sides of a hub 55, and the arms 53, 54 being similarly formed on a hub 56. The transfer arms 53, 54 are angularly disposed, slightly in advance of the arms 51, 52 as best shown in Fig. 4. The hubs 55, 56 are freely mounted on a cross shaft or drive member 57 (Fig. 5) which is journaled in bearings 58 formed in the upright support brackets 45. The shaft is continuously rotated in time with the travel of the conveyor C and in a counterclockwise direction as viewed in Fig. 1. This rotation of the shaft is effected by an endless chain 61 which operates over a sprocket 62 carried on the outer end of the shaft and over a driving sprocket 63 rotatably mounted on a stationary idler shaft 64 secured in the bracket 39. The driving sprocket 63 is formed with a gear 60 which meshes with and is driven by a gear 70 carried on the main drive shaft 38.

The transfer arms 51, 52 and the auxiliary transfer arms 53, 54 and their hubs 55, 56 are rotated with the shaft 57, by a pair of bell cranks 65, 66 which are mounted on pivot pins 67 secured in the outer ends of fixed arm cranks 68, 69 carried on and keyed to the cross shaft 57. In this shaft assembly, the two transfer arm hubs 55, 56 are disposed adjacent each other and between the two fixed arm cranks 68, 69, the fixed arm crank 68 being adjacent the outer face of the hub 55 while the other fixed arm crank 69 is adjacent the outer face of the hub 56. Thus the fixed arm cranks prevent lateral displacement of the freely mounted hubs 55, 56.

The bell cranks 65, 66 control the movement of the transfer arms 51, 52 and the auxiliary transfer arms 53, 54. For this purpose one arm of the bell crank 66 carries a slide block 71 (Figs. 4 and 5) which operates in a short slide groove 72 formed in the outer face of the auxiliary transfer arm 53. The other arm of the bell crank carries a cam roller 74 (Figs. 4 and 6) which operates in a cam groove 75 of a stationary face cam 76 formed on the adjacent bearing 58 of the bracket 45.

In a similar manner one arm of the opposite bell crank 65 carries a slide block 78 (Figs. 4 and 5) which operates in a short slide groove 79 formed in the outer face of the transfer arm 51. The other arm of the bell crank 65 carries a cam roller 81 (Figs. 4 and 6) which operates in a cam groove 82 (Figs. 3 and 5) of a stationary face cam 83 formed on the adjacent bearing 58 of the bracket 45.

Thus as the cross shaft 57 rotates, it revolves the fixed arm cranks 68, 69 through a circular path of travel and thus causes the cam rollers 74, 81 of the bell cranks 65, 66 to traverse their cam grooves 75, 82 and also causes the slide blocks 71, 78 of the bell cranks to rotate the transfer arms 51, 52 and the auxiliary transfer arms 53, 54 in time with the fixed arm cranks 68, 69. During this rotation of the transfer arms and the auxiliary transfer arms, their outer ends are swept through a circular path of travel which extends through the path of travel of the bodies B advancing with the conveyor C and also through the working station D.

When a transfer arm 51, 52 or an auxiliary transfer arm 53, 54 passes adjacent the conveyor C, it pauses in its travel to pick up from the conveyor or to release to the conveyor, a container body B. This pause is brought about by the shape of the cam grooves 75, 82, the grooves being formed with nonconcentric sections 86, 87 which rock the bell cranks 65, 66 in the proper direction to temporarily retard the advancement of the transfer arms. Simultaneously the same nonconcentric sections 86, 87 of the cam grooves retard the advancement of the opposite transfer arms at the working station D to pick up or release a body B at this station.

Figure 8:
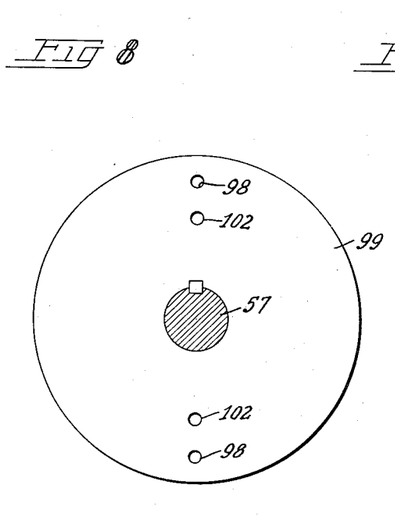
Figs. 8 and 9 are face views of valve parts shown in Fig. 5 and viewed from opposite sides of a plane indicated by the line 8—8 in that figure.

Picking up the releasing of the container bodies B is effected by two-sided pickup pockets 91 which are formed on the outer ends of the transfer or pickup arms 51, 52 and by two-sided delivery pockets 92 which are formed on the outer ends of the auxiliary transfer or delivery arms 53, 54. The base of each pocket 91, 92 is formed with a vacuum cup 95 (see Figs. 2 and 5) which communicates with a short vacuum channel 96 (see also Fig. 6) formed in the transfer and auxiliary transfer arms. The channels 96 in the transfer arms 51, 52 are connected by flexible tubes 97 to a pair of oppositely disposed ports 98 (Figs. 5 and 8) formed in a rotating valve plate 99 mounted on and keyed to the main cross shaft 57. In a similar manner the channels 96 in the transfer arms 53, 54 are connected by flexible tubes 101 to a pair of oppositely disposed ports 102 located adjacent the ports 98 and formed in the rotating valve plate 99.

Figure 9:
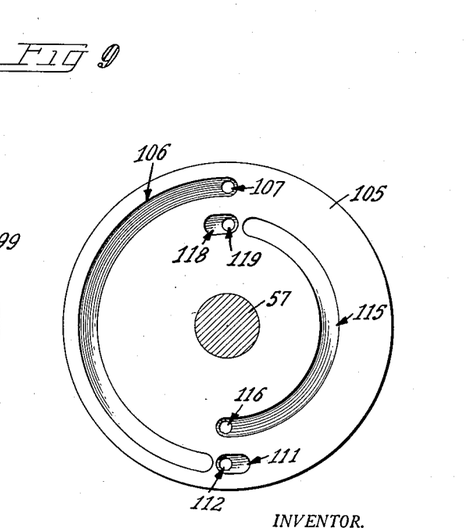

The valve plate 99 rotates with the fixed cranks 68, 69. The outer face of this valve plate is in sealing engagement with the inner face of a stationary valve plate 105 (Figs. 5 and 9) which surrounds the driving cross shaft 57 and which is formed integrally with the adjacent bearing 58 of the support bracket 45. This stationary valve plate 105 is formed, in its inner face, with a concentric vacuum groove 106 which is in alignment with the path of travel of the port 98 in the rotary valve plate 99. This vacuum groove 106 starts adjacent the working station D, extends substantially half-way around the stationary valve plate and terminates adjacent the conveyor C.

The starting end of the groove 106 is in communication with a vacuum port 107 formed in the stationary valve plate 105. This port is connected by a tube 108 to any suitable source of vacuum which maintains a vacuumized condition in the groove 106. Adjacent the terminal end of the groove 106, the stationary valve plate 105 is formed with a separate short vent groove 111 (Fig. 9) which communicates with a vent port 112 formed in the plate. This vent port communicates with the atmosphere.

Thus as the rotary valve plate 99 rotates over the stationary valve plate 105, one of the rotating ports 98 registers with the vacuum groove 106 for drawing a vacuum on one of the vacuum cups 95 in one of the auxiliary transfer arms 53, 54 while the opposite port 98 rotates adjacent the blank face of the stationary valve plate and is maintained in an unvacuumized condition.

In a similar manner and for the same purpose, the stationary valve plate 105 is formed with a concentric vacuum groove 115 (Fig. 9) for the ports 102 in the rotary valve plate 99. This vacuum groove 115 is formed in the plate opposite the groove 106 and starts at the conveyor C. This groove extends upwardly substantially halfway around the plate and terminates adjacent the working station D. The starting end of the groove is in communication with a vacuum port 116 (Fig. 9) formed in the stationary valve plate 105. This port is connected by a tube 117 (Fig. 2) to any suitable source of vacuum for maintaining the groove in a vacuumized condition. Adjacent the terminal end of the groove 115, the stationary valve plate 105 is formed with a separate short vent groove 118 (Figs. 5 and 9) which communicates with a vent port 119 formed in the plate. This vent port communicates with the atmosphere.

Figure 10:
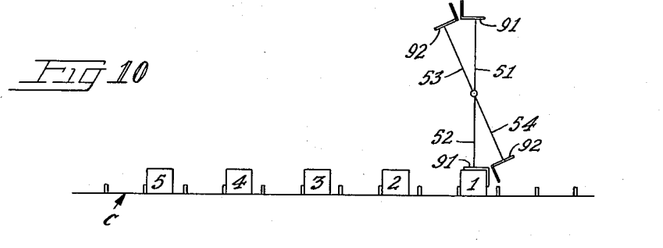
Figs. 10, 11, 12, 13, 14 and 15 are schematic views showing the steps of transferring an article from a moving conveyor through a work station and returning it to the conveyor for continued advancement therewith.

In the operation of the transfer mechanism, as schematically shown in Figs. 10 to 15 inclusive, the transfer or pickup arm 52 initially rotates into position, adjacent the conveyor C, just ahead of body 1 so that the pocket 91 of this transfer arm arrives at this station just before the body arrives there. As hereinbefore explained, the arm pauses momentarily at this station. During this pause, the moving body advances into the pocket 91 as shown in Fig. 10. At this station the port 102 (Fig. 8) for the arm 52, in the rotary valve plate 99 registers with the vacuum groove 115 (Fig. 9) in the stationary valve plate 105 and thus the vacuum cup 95 for the arm 52 becomes vacuumized and holds the body 1 in place in the pocket 91.

Figure 11:
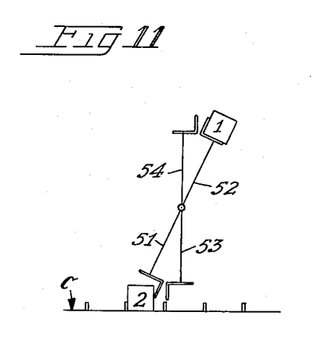

With the body 1 held in the pocket 91 of arm 52, the arm sweeps upwardly toward the working station D and carries the body 1 counterclockwise through a curved path of travel as shown in Fig. 11. Curved guide rails 125 (Fig. 4) disposed adjacent this curved path of travel of the body assist in holding the body in its pocket during this movement. These guide rails are transversely connected by cross straps 126 the ends of which are secured to the stationary cams 76, 83. The strap 126 at the station D is supported on a bracket 127 secured to the adjacent upright bracket 45. During this travel of the arm 52, its opposite arm 51 sweeps downwardly around the opposite side from the working station D toward the conveyor and enters the space just ahead of body 2 for the reception of this body.

Figure 12:
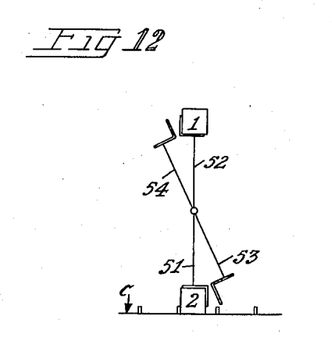

With continued movement of the arms 51, 52, the arm 52 carries the body 1 into the working station D as shown in Fig. 12 and then pauses. This causes the arm 51 to pause at the conveyor C to pick up body 2. As the arm 52 moves into position at the working station its corresponding port 102 in the rotary valve plate 99 moves out of register with the vacuum groove 115 in the stationary valve plate 105 and advances into register with the atmosphere groove 118. This breaks the vacuum in the cup 95 which is holding the body 1 and thus releases the body just as it enters the working station D. The parts of the machine for performing the operation upon the body come into play at this time to perform the operation.

Figure 13:
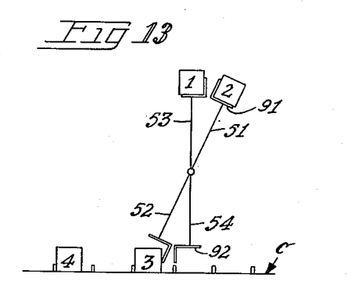
Figure 14:
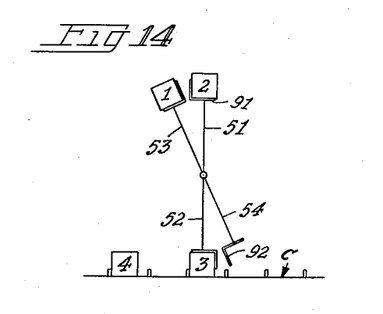

While the operation is being performed on the body, the arm 52 sweeps downwardly toward the conveyor C in an empty condition thereby leaving the body 1 at the working station so that ample time will be provided to complete the operation. As the empty arm 52 returns to the conveyor to pickup body 3 as shown in Fig. 13, its associated arm 51 carries the body 2 upwardly toward the working station D. However the upwardly moving arm 51 is preceded slightly by the auxiliary transfer arm 53 and this arm moves into engagement with the stationary body 1 at the working station D and comes to rest as shown in Fig. 13, while arm 51 with its body 2 is moving toward this station.

At the working station D, the operating parts release the body 1 and the body is immediately drawn into the pocket 92 of the auxiliary transfer arm 53 and held in place by its vacuum cup 95 which through its port 98 is now in communication with the vacuum groove 106. After its momentary pause at the working station D to pick up the operated-upon body 1, the auxiliary transfer arm 53 sweeps through its downward path of travel toward the conveyor C while the transfer arm 51 advances the body 2 into the working station D and leaves it there as explained above to be operated upon.

Figure 15:
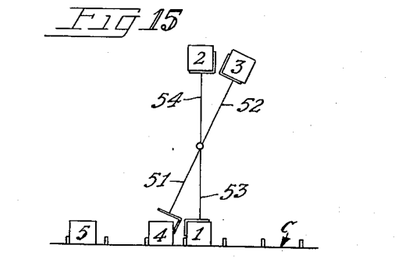

As the auxiliary transfer arm 53 carries the body 1 down toward the conveyor C, its port 98 remains in communication with the vacuum groove 106 and thereby through its vacuum cup 95, holds the body in its pocket. The body is also retained in place by the guide rails 125 which also extend around this side of the mechanism. As the body 1 approaches the conveyor C its auxiliary transfer arm 53 delivers the body into position on the conveyor in the space just ahead of body 4 as best shown in Fig. 15. It is for this purpose that a space and a feed dog 42 of the conveyor are left empty as when the bodies are initially placed on the conveyor as hereinbefore mentioned.

As the body 1 is positioned on the conveyor, the port 98 of its auxiliary transfer arm 53 rides out of communication with the vacuum groove 106 and shifts into register with the atmosphere groove 111. This action cuts off the vacuum from the cup 95 in the transfer arm 53 and releases the body 1 to the conveyor. Simultaneously with this action the auxiliary transfer arm 54 picks up the body 2 at the working station D for delivery onto the conveyor in the space just ahead of body 5. A body delivered into the conveyor by an auxiliary transfer arm 53, 54 is engaged by the adjacent feed dog 42 and is carried by the conveyor to a subsequent operating station or to any suitable place of deposit.

In this manner the transfer arms 51, 52 pick up the bodies from the continuously moving conveyor C while the arms pause at the conveyor and deliver them into the working station D when they pause at this station and return to the conveyor in an empty condition. In cooperation with these transfer arms 51, 52, the auxiliary transfer arms 53, 54, when they pause at the working station D pick up an operated-upon body and return it to the conveyor for further advancement therewith, returning to the working station in an empty condition. Thus for each full 360 degrees cycle of travel of a body as it travels from the conveyor to the working station and thence return to the conveyor, the cross shaft 57 of the mechanism rotates through one and one-half revolutions or 540 degrees. This provides a rest period for a body at the working station D, of a full half revolution or 180 degrees of the cycle of travel, so that ample time is available for operating on the body while it is at the working station.

As illustrated in the drawings, provision is made for only one transfer mechanism and one working station. Thus the transfer mechanism picks up every body on the conveyor, passes it through the working station D and returns it to the alternately empty spaces on the conveyor. However any number of transfer mechanisms and working stations D may be provided along the path of travel of the conveyor C, so that a plurality of operations may be performed upon the bodies or so that duplicate operations may be performed on different bodies.

For example, if the machine is to perform only one operation on the bodies, two, three or more working stations D performing the same operation may be served by transfer mechanisms which rotate at such a speed that each mechanism will pick up every alternate (in the case of two stations) or every third (in the case of three stations) body on the conveyor. In such an arrangement, two, three or more bodies may be operated on at the same time with the result that the speed of production of the machine may be greatly increased.

In any case the order in which the bodies or other articles are picked off the conveyor by the transfer mechanisms depends upon the number of working stations provided and the number of operations required, the invention being adapted to the use of any desired number of transfer stations.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for performing an operation upon successive articles, the combination of actuating means for moving a procession of articles along a predetermined path of travel in spaced and timed order, a work performing station disposed adjacent the path of travel of said articles, rotary transfer means disposed between said actuating means and said station for transferring articles from said actuating means into said station and for leaving them at said station for an operation thereupon, and rotary auxiliary transfer means mounted coaxially with said transfer means for engaging and returning operated-upon articles from said station to said actuating means for continued movement along said path of travel.

2. In a machine for performing an operation upon successive articles, the combination of a conveyor for moving a procession of articles continuously along a predetermined path of travel in spaced and timed order, a work performing station disposed adjacent the path of travel of said articles, a rotatable transfer arm disposed between said conveyor and said station for engaging and transferring an article from said conveyor into said station and for leaving said article at said station for an operation thereupon, and a rotatable auxiliary transfer arm mounted coaxially with said transfer arm and rotatable in timed relation with said transfer arm for engaging and returning said article after being operated upon from said station to said conveyor for continued movement along said path of travel.

3. In a machine for performing an operation upon successive articles, the combination of a conveyor for moving a procession of articles continuously along a predetermined path of travel in spaced and timed order, a work performing station disposed adjacent the path of travel of said articles, a rotatable transfer arm disposed between said conveyor and said station for engaging and transferring an article from said conveyor into said station and for releasing said article at said station for an operation thereupon, a rotatable auxiliary transfer arm mounted coaxially with and rotatable in the same direction in timed relation with said transfer arm for engaging and returning said article after being operated upon from said station to said conveyor for continued movement along said path of travel, and guide rails disposed adjacent the path of travel of said articles during transfer from and return to said conveyor for guiding the moving articles.

4. In a machine for performing an operation upon successive articles, the combination of a conveyor for moving a procession of articles continuously along a predetermined path of travel in spaced and timed order, a work performing station disposed adjacent the path of travel of said articles, a rotatable transfer arm operating between said conveyor and said station for engaging and transferring an article from said conveyor into said station and for releasing said article at said station for an operation thereupon, a rotatable auxiliary transfer arm mounted coaxially with and rotatable in timed relation with said transfer arm for engaging and returning an article after being operated upon from said station to said conveyor for continued movement along said path of travel, gripper means on said transfer arm and said auxiliary transfer arm for holding an article in place on said arms during transfer movement therewith, and means effective upon said gripper means for releasing an article from said transfer arm at said station and for releasing an operated-upon article from said auxiliary transfer arm at said conveyor.

5. In a machine for performing an operation upon successive articles, the combination of a conveyor for moving a procession of articles continuously along a predetermined path of travel in spaced and timed order, a work performing station disposed adjacent the path of travel of said articles, a rotatable transfer arm disposed and operating between said conveyor and said station for engaging and transferring an article from said conveyor into said station and for releasing said article at said station for an operation thereupon, a rotatable auxiliary transfer arm mounted coaxially and operating in timed relation with said transfer arm for returning an article after being operated upon from said station to said conveyor for continued movement along said path of travel, a pickup head on said transfer arm for picking up an article from said conveyor for transfer into said station, a delivery head on said auxiliary transfer arm for engaging and delivering an article from said station to said conveyor, a vacuum cup located in each of said heads for holding an article in place therein during transfer of the article, and valve means connecting a source of vacuum and a vent with said vacuum cups for controlling the holding of the articles in their heads and for releasing an article to be operated upon from its head at said station and for releasing an article after an operation thereon from its head at said conveyor.

6. In a machine for performing an operation upon successive articles, the combination of a conveyor for moving a procession of articles continuously along a predetermined path of travel in spaced and timed order, a work performing station disposed adjacent the path of travel of said articles, a rotatable transfer arm disposed and operating between said conveyor and said station for engaging and transferring an article from said conveyor into said station and for releasing said article at said station for an operation thereupon, a rotatable auxiliary transfer arm mounted coaxially with and rotating in timed relation with said transfer arm for engaging and returning an article after being operated upon from said station to said conveyor for continued movement along said path of travel, and means for rotating said arms and for temporarily arresting their rotation at said conveyor and at said station.

7. In a machine for performing an operation upon successive articles, the combination of actuating means moving a procession of articles continuously along a predetermined path of travel in spaced and timed order, a work performing station disposed adjacent the path of travel of said articles, a rotatable transfer arm operating between said actuating means and said station and transferring an article from said actuating means into said station and leaving said article at said station for an operation thereupon, a rotatable auxiliary transfer arm operating between said station and said actuating means in timed relation with said transfer arm and returning an article after being operated upon from said station to said actuating means for continued movement along said path of travel, a continuously rotating drive member on which said arms are freely mounted, an arm crank secured to said drive member for each of said arms, a bell crank pivotally mounted on each of said arm cranks, one of said bell cranks being connected with said transfer arm and the other bell crank being connected with said auxiliary transfer arm for rotating the arms with said drive member, and stationary cam means engageable with said bell cranks for shifting said transfer arm and said auxiliary transfer arm relative to said arm cranks for arresting the rotation of said arms at said actuating means and said station for engaging and delivering an article during its transfer.

8. A transfer mechanism for transferring articles from a continuously moving conveyor into a work performing station and for returning them to the conveyor in timed order for continued travel therewith, comprising in combination a rotatable transfer arm disposed between said conveyor and said station for engaging and transferring an article from said conveyor into said station and for releasing the article at said station for an operation thereon, and a rotatable auxiliary transfer arm mounted coaxially with said transfer arm for engaging and returning the article after the operation thereon from said station to said conveyor for continued travel therewith.

9. A transfer mechanism for transferring articles from a continuously moving conveyor into a work performing station and for returning them to the conveyor in timed order for continued travel therewith, comprising in combination a plurality of rotatable transfer arms operating in unison and disposed between said conveyor and said station for engaging and transferring articles successively from said conveyor into said station and for releasing the articles at said station for an operation to be performed thereon, and a plurality of rotatable auxiliary transfer arms disposed adjacent and mounted coaxially with said transfer arms and operating in unison and in timed relation with the latter for engaging and returning the articles after the operation thereon successively from said station to said conveyor for continued travel therewith.

10. A transfer mechanism for transferring articles from a continuously moving conveyor into a work performing station and for returning them to the conveyor in timed order for continued travel therewith, comprising in combination a rotatable transfer arm operating at a locality between said conveyor and said station for engaging and transferring an article from said conveyor into said station and for releasing the article at said station for an operation to be performed thereon, a rotatable auxiliary transfer arm mounted coaxially and rotating with said transfer arm for engaging and returning the operated-upon article from said station to said conveyor for continued travel therewith, gripper means on each of said transfer arms for holding an article in place thereon during transfer movement therewith, means for releasing an article to be operated upon when it is introduced into said station and for releasing an operated-upon article when it is returned to said conveyor, and means for rotating said arms and for temporarily arresting their rotation at said conveyor and at said station for picking up and for delivering said article at both of the described localities.

11. A transfer mechanism for transferring articles from a continuously moving conveyor into a work performing station and for returning them to the conveyor in timed order for continued travel therewith, comprising in combination, a continuously rotating drive member disposed between said conveyor and said station, a pair of arm cranks secured to said drive member and rotating therewith, a rotatable transfer pickup arm freely mounted on said drive member adjacent one of said arm cranks and operating between said conveyor and said station for picking up an article from said conveyor and for depositing it into said station for an operation thereupon, a rotatable transfer delivery arm freely mounted on said drive member adjacent the other of said arm cranks and operating between said station and said conveyor for receiving an operated-upon article from said station and for delivering it to said conveyor for continued travel therewith, a bell crank pivotally mounted on each of said arm cranks, one of said bell cranks being connected with said transfer pickup arm and the other of said bell cranks being connected with said transfer delivery arm, and stationary cam means engageable by said bell cranks, said cam means through said bell cranks during rotation of said arm cranks holding said arm cranks and said transfer arms in fixed relation for rotating said arms and during passage adjacent said conveyor and said station arresting movement of said transfer arms for picking up and delivering said articles.

12. In a machine for performing an operation upon successive articles, the combination of a conveyor for moving a procession of articles continuously along a horizontal path of travel in spaced and timed order, a work station disposed above the path of travel of said articles, a pair of independent rotatable transfer arms mounted on a common horizontal axis between said conveyor and said work station, one of said arms being operative to elevate and transfer articles from said conveyor to said station for temporarily depositing said articles for an operation thereupon, the other of said arms being operative to lower and return said articles from said station to said conveyor for continued movement along said path of travel, means carried by said arms for holding the articles in place thereon during transfer of the articles from said conveyor to said work station and vice versa, and means for periodically actuating said holding means to grip articles removed from said conveyor and to release the gripped articles at said work station, and vice versa, for the purposes described.

WILLIAM PECHY.

REFERENCES CITED

The following references are of record in the file of this patent:

UNITED STATES PATENTS

| Number | Name | Date |
|---|---|---|
| 1,100,374 | Hughes | June 16, 1914 |
| 1,580,193 | Fooks | Apr. 13, 1926 |
| 1,620,120 | Morshead et al. | Mar. 8, 1927 |
| 1,690,439 | Wigglesworth | Nov. 6, 1928 |
| 1,766,018 | Flook | June 24, 1930 |
| 1,847,485 | Kantor | Mar. 1, 1932 |
| 2,359,433 | McNamara | Oct. 3, 1944 |
| 2,468,255 | Dunn | Apr. 26, 1949 |